United States Patent
Brown

(10) Patent No.: US 9,582,738 B2
(45) Date of Patent: Feb. 28, 2017

(54) AUTOMATICALLY GENERATING NOTES AND CLASSIFYING MULTIMEDIA CONTENT SPECIFIC TO A VIDEO PRODUCTION

(71) Applicant: Stephen J. Brown, Woodside, CA (US)

(72) Inventor: Stephen J. Brown, Woodside, CA (US)

(73) Assignee: Invent.ly LLC, Woodside, CA (US)

( * ) Notice: Subject to any disclaimer, the term of this patent is extended or adjusted under 35 U.S.C. 154(b) by 541 days.

(21) Appl. No.: 14/188,122

(22) Filed: Feb. 24, 2014

(65) Prior Publication Data

US 2015/0244943 A1      Aug. 27, 2015

(51) Int. Cl.
| | | |
|---|---|---|
| *G06F 3/00* | (2006.01) | |
| *G06K 9/62* | (2006.01) | |
| *G06F 17/24* | (2006.01) | |
| *G06F 17/30* | (2006.01) | |
| *H04N 7/18* | (2006.01) | |

(Continued)

(52) U.S. Cl.
CPC ........... *G06K 9/6267* (2013.01); *G06F 17/241* (2013.01); *G06F 17/3028* (2013.01); *G06F 17/30265* (2013.01); *G06F 17/30268* (2013.01); *G06K 9/00684* (2013.01); *H04N 5/262* (2013.01); *H04N 7/18* (2013.01); *G06K 2209/27* (2013.01)

(58) Field of Classification Search
CPC ............... G06F 17/241; G06F 17/3028; G06K 9/00684; G06K 2209/27
See application file for complete search history.

(56) References Cited

U.S. PATENT DOCUMENTS

| | | | |
|---|---|---|---|
| 8,311,344 B2* | 11/2012 | Dunlop | .............. G06K 9/00664 382/224 |
| 8,520,909 B2* | 8/2013 | Leung | ............... G06F 17/30247 382/118 |
| 8,525,888 B2 | 9/2013 | Abe | |

(Continued)

FOREIGN PATENT DOCUMENTS

EP            2469230 A1      6/2012

OTHER PUBLICATIONS

OpenTSDB—A Distributed, Scalable Monitoring System, © 2010-2013 The OpenTSDB Authors, http://opentsdb.net/index.html.

(Continued)

*Primary Examiner* — Omar Abdul-Ali
(74) *Attorney, Agent, or Firm* — Rahman LLC

(57) ABSTRACT

Automatically classifying multimedia content that is specific to a video production includes obtaining, from a video sensor embedded in a video capturing device that captures a video, a time series of location data, direction data, orientation data, and a position of the first user and the second user, identifying for any given duration in the video, corresponding first user data, corresponding second user data, and corresponding video sensor data, annotating the video with the corresponding first user data, the corresponding second user data, and the corresponding video sensor data to obtain an annotated multimedia content, performing a comparison of a data pattern of the annotated multimedia content with data patterns of a script stored in a database to obtain a recommended section for the annotated multimedia content, and automatically classifying the annotated multimedia content by associating the annotated multimedia content with the recommended section.

20 Claims, 7 Drawing Sheets

(51) Int. Cl.
*H04N 5/262* (2006.01)
*G06K 9/00* (2006.01)

(56) References Cited

U.S. PATENT DOCUMENTS

| | | |
|---|---|---|
| 2005/0046706 A1 | 3/2005 | Sesek et al. |
| 2007/0030348 A1 | 2/2007 | Snyder |
| 2007/0201558 A1* | 8/2007 | Xu ............... G06K 9/6218 375/240.22 |
| 2008/0129825 A1 | 6/2008 | DeAngelis et al. |
| 2009/0115862 A1* | 5/2009 | Andersson ........... G09B 29/106 348/222.1 |
| 2011/0087703 A1* | 4/2011 | Varadarajan ..... H04N 21/23418 707/794 |
| 2012/0110082 A1 | 5/2012 | Brown et al. |
| 2012/0300089 A1 | 11/2012 | Sbaiz et al. |
| 2012/0307048 A1 | 12/2012 | Abrahamsson et al. |
| 2013/0046761 A1 | 2/2013 | Soderberg et al. |
| 2013/0091431 A1* | 4/2013 | Master ............. H04N 21/44008 715/719 |
| 2013/0282747 A1 | 10/2013 | Cheng et al. |
| 2014/0099070 A1* | 4/2014 | Makino ................ G11B 27/031 386/240 |
| 2015/0009363 A1* | 1/2015 | Li ..................... G11B 27/3081 348/231.3 |

OTHER PUBLICATIONS

TempoDB, The time series database-as-a-service, TempoDB Inc. © 2014, https://tempo-db.com/.
Sensor Hub Partner—Bosch Sensortec GmbH, Product URL:http://www.bosch-sensortec.com/en/homepage/products_3/9_axis_sensors_5/ecompass_2/bno055_2/bno055_3, Website: http://www.bosch-sensortec.com.
ADIS16407 datasheet and product info | Ten Degrees of Freedom Inertial Sensor | MEMS Inertial Measurement Units | Analog Devices http://www.analog.com/en/mems-sensors/mems-inertial-measurement-units/adis16407/products/product.html.
Apache Mahout, What is Apache Mahout?, Copyright © 2014 The Apache Software Foundation, Licensed under the Apache License, Version 2.0., http://mahout.apache.org/.
Time Series Analysis and Forecasting with Weka, Pentaho Data Logo, Pentaho package for Weka, Adaptavist Theme Builder (4.2.0) Powered by Atlassian Confluence 3.3.3, the Enterprise Wiki, http://wiki.pentaho.com/display/DATAMINING/Time+Series+Analysis+and+Forecasting+with+Weka.

* cited by examiner

| TIME | SENSOR DATA | FIRST USER DATA | SECOND USER DATA | VIDEO SENSOR DATA | EXTERNAL SENSOR DATA |
|---|---|---|---|---|---|
| T1 | LOCATION DATA | USER 102A 2MTS AWAY FROM A VIDEO CAPTURING DEVICE | USER 102B 3MTS AWAY FROM A VIDEO CAPTURING DEVICE | USER 102A 2MTS AWAY, AND USER 102B 3MTS AWAY FROM A VIDEO CAPTURING DEVICE | |
| | DIRECTION DATA | USER 102A FACING USER 102B | USER 102B FACING USER 102A | USER 102A AND USER 102B FACING EACH OTHER | USER 102A RESPIRATION RATE IS HIGH |
| | ORIENTATION DATA | USER 102A FACING USER 102B FROM LOCATION X | USER 102B FACING USER 102A FROM LOCATION Y | USER 102A AND USER 102B FACING EACH OTHER FROM LOCATION X AND Y | |
| | POSITION DATA | ............ | ............ | USER 102A 2MTS, AND USER 102B 3MTS AWAY FROM VIDEO CAPTURING DEVICE FROM CORRESPONDING LOCATIONS | |
| TN | LOCATION DATA | USER 102A 3 MTS AWAY FROM A VIDEO CAPTURING DEVICE | USER 102B 5 MTS AWAY FROM USER 102A | USER 102A 3MTS AWAY, AND USER 102B 5MTS AWAY FROM A VIDEO CAPTURING DEVICE | |
| | DIRECTION DATA | USER 102A FACING USER 102B | USER 102B FACING PUBLIC | USER 102A FACING USER 102B AND USER 102B FACING PUBLIC | ............ |
| | ORIENTATION DATA | USER 102A FACING 102B AT LOCATION A | USER 102B FACING PUBLIC AT LOCATION A | USER 102A FACING 102B, AND USER 102B FACING PUBLIC AT LOCATION A | |
| | POSITION DATA | ............ | ............ | USER 102A 3MTS AWAY, AND USER 102B 5MTS AWAY FROM THE VIDEO CAPTURING DEVICE AT LOCATION A | |

FIG. 3

FADE IN:

EXT. WRITERS INTERVIEW – DAY (SCENE 1)

Scene Information: Smith interviews John for a position at 'XYZ' company at Los Angeles

INT. WRITERS INTERVIEW – HUMAN RESOURCE MANAGER ROOM – DAY

JOHN, a job seeker, sits approximately 2 meters away from a video capturing device, and facing Smith SMITH, a HR manager of 'XYZ' company, facing user John SMITH
        Are you comfortable now?

JOHN
                 Yes
              - - - - -
              - - - - -

SMITH
   Congrats! You are shortlisted for the Job

JOHN
  Thanks. I feel very excited (Agitated)

EXT. WRITERS AMUSEMENT PARK – DAY (SCENE N)

Scene Information: John and Smith become friends, and they are meeting outside at XYZ Amusement park. Smith is facing public at the XYZ amusement park, and standing 5 meters away from John.

SMITH
    Too crowded, but I don't mind

JOHN
      Let's go for lunch

FIG. 4

AUTOMATICALLY GENERATING NOTES AND CLASSIFYING MULTIMEDIA CONTENT SPECIFIC TO A VIDEO PRODUCTION

CROSS-REFERENCE TO RELATED APPLICATIONS

This application relates to U.S. patent application Ser. No. 14/188,035 filed on Feb. 24, 2014 and entitled "Classifying and Annotating Images Based on User Context," the complete disclosure of which, in its entirety, is herein incorporated by reference.

BACKGROUND

Technical Field

The embodiments herein generally relate to video production systems, and more particularly to automatically generating notes and classifying multimedia content specific to a video production using a video production system.

Description of the Related Art

With the falling costs and increased ease of use of advanced digital video recording technology, professional film and video producers, directors, and editors are flooded with more video content than ever before. Even a short duration feature film (e.g., a 90 minute feature film) may have hours of production video content with (i) multiple camera angles and subjects, and (ii) multiple data. This can be extremely expensive and time consuming to manage and catalog video content for a production, which takes place over many months or even years. Even with a well-organized video management process, producers, directors, and editors often struggle and waste time searching for a particular video content for a story or scene, often relying on their memories and notes.

It further becomes difficult to manage the video content being produced when multiple camera angles must be cataloged and synchronized with multiple separate audio feeds from boom microphones and lavaliere microphones which may be wireless and monitored by a sound engineer or by camera operators. The problem further arises for the video content management in a consumer field as most people capture and archive more video content from settings over a lifetime. This becomes even harder for users of that content to find exactly what they are looking for.

Video content management systems that are already in the market allow users to organize content with consistent naming conventions, and organize file folders around one or more topics. There are a few editing systems that allow users to manually add notes to video and audio files. However, the fundamental problem with such systems is that folders only have one dimension, and video files are in one folder around one topic or are replicated across many folders with subsequently many other topics creating an explosion of content and a version control hazard.

Other attempts have been made to analyze and search the video images for subjects, objects, and other features using facial recognition or subject and object recognition software approaches. These approaches are imprecise and can lead to missing or misclassifying important subjects, while still not capturing important attributes that might be needed by the producer. Accordingly, there remains a need for accurately annotating multimedia content with useful and accurate data, and automatically classifying one or more sections in the annotated multimedia content, thus allowing users of the annotated multimedia content being classified to quickly and accurately organize and search for a specific content based on a wide variety of features.

SUMMARY

In view of the foregoing, an embodiment herein provides a method of automatically classifying multimedia content that is specific to a video production based on a user context. The method includes obtaining, by a processor, from a video sensor embedded in a video capturing device that captures a video associated with a first user and a second user, video sensor data that includes a time series of location data, direction data, orientation data, and a position of the first user and the second user being recorded; identifying, by the processor, for any given duration associated with the video, corresponding first user data, corresponding second user data, and corresponding video sensor data; annotating, by the processor, the video with the corresponding first user data, the corresponding second user data, and the corresponding video sensor data to obtain an annotated multimedia content; performing, by the processor, a comparison of a data pattern of the annotated multimedia content with data patterns that correspond to one or more predefined sections of a script stored in a database to obtain a recommended section for the annotated multimedia content; and automatically classifying, by the processor, the annotated multimedia content by associating the annotated multimedia content with the recommended section. The one or more predefined sections are specific to the video production. The data pattern includes first user data, second user data, and video sensor data associated with a section of the annotated multimedia content.

A list of prioritized predefined sections may be generated from the one or more predefined sections based the comparison. The recommended section is a highest priority section from the list of prioritized predefined sections. At least one user-suggested section from a user may be received and processed by the processor. The method may further include associating the annotated multimedia content with the at least one user-suggested section instead of the recommended section.

The method may further include establishing a quantitative weight factor associated with at least one of the video sensor data associated with the video; modifying the quantitative weight factor associated with the at least one of the video sensor data associated with the video to obtain a modified weight factor such that the user-suggested section becomes prioritized over the recommended section upon the comparison being performed based on the modified weight factor; and determining a modified recommended section for a subsequent video to be recorded at a subsequent time based on the modified weight factor.

The script may include identities, dialogues, activities, characters, locations, directions, orientations, positions, movements, scenes, and themes associated with the first user and the second user. Notes for at least one of the recommended section or the user-suggested section of the annotated multimedia content may be automatically generated from at least one of the first user data, the second user data, and the video sensor data based on the comparison and the quantitative weight factor. The notes may include identities of the first user and the second user, a line in the script at which the first user or the second user is talking, character information, scene information, and event information. The activities of the first user or the second user may include at least one of the first user facing the second user, the first user approaching the video capturing device at a distance from the first user, the second user talking to the first user, the second user talking and facing the video capturing device, and health information of the first user or the second user.

The method may further include obtaining, by the processor, data from at least one additional sensor that senses identities or health-related information including heart rates, perspirations, and respirations of the first user and the second user. The data pattern may include the data from the additional sensor that is specific to at least one of the recommended section or the user-suggested section of the annotated multimedia content. The method may further include synchronizing, by the processor, the first user data, the second user data, and the video sensor data to identify the corresponding first user data, the corresponding second user data, and the corresponding video sensor data for the any given duration.

The recommended section of the annotated multimedia content may be obtained based on a set of rules that are stored in a database. The method may further include obtaining, by the processor, from a central network computing device, data from prior scenes and shoots that are specific to the video production, the location data, and weather information of the shoots.

An annotation of the video, a classification of the recommended section or the user-suggested section of the annotated multimedia content, and a generation of notes for the recommended section or the user-suggested section, is further based on prior multimedia content including predefined data, user information, and classifications associated with videos that were previously captured by the video production.

In another aspect, a system for automatically classifying multimedia content that is specific to a video production based on a user context is provided. The system includes a video capturing device that captures a video associated with a first user and a second user; a video sensor embedded in the video capturing device, that captures a video sensor data including a time series of a location data, a direction data, an orientation data, and a position of the first user and the second user being recorded; a memory unit that stores instructions; a database operatively connected to the memory unit; and a processor, when configured by the instructions, executes a set of modules. The set of modules includes a sensor data obtaining module, executed by the processor, that obtains the first user data, the second user data, and the video sensor data; an identification module, by the processor, that identifies for any given duration associated with the video, corresponding first user data, corresponding second user data, and corresponding video sensor data; an annotation module, executed by the processor, that annotates the video with the corresponding first user data, the corresponding second user data, and the corresponding video sensor data to obtain an annotated multimedia content; a comparison module, executed by the processor, that performs a comparison of a data pattern of the annotated multimedia content with data patterns that correspond to one or more predefined sections of a script stored in the database to obtain a recommended section; and a classification module, executed by the processor, that automatically classifies the annotated multimedia content by associating the annotated multimedia content with the recommended section. The one or more predefined sections are specific to the video production. The data pattern includes a first user data, a second user data, and a video sensor data associated with a section of the annotated multimedia content.

A list of prioritized predefined sections may be generated from the one or more predefined sections based the comparison. The recommended section is a highest priority section from the list of prioritized predefined sections. The set of modules may further include a weight assigning module, executed by the processor, that establishes a quantitative weight factor associated with at least one of the video sensor data associated with the video, modifies the quantitative weight factor associated with the said video sensor data associated with the video to obtain a modified weight factor such that a user-suggested section becomes prioritized over the recommended section upon the comparison being performed based on the modified weight factor, and determines a modified recommended section for a subsequent video to be recorded at a subsequent time based on the modified weight factor; and a generation module, executed by the processor, that generates notes for at least one of the user-suggested section or the recommended section of the annotated multimedia content from the first user data, the second user data, and the video sensor data.

The notes for the user-suggested section or the recommended section of the annotated multimedia content may include identities of the first user and the second user, a line in the script at which the first user or the second user is talking, activities of the first user or the second user, character information, scene information, and event information. The system may further include an additional sensor that senses identities, or health-related information that includes heart rates, perspirations, and respirations of the first user and the second user. The set of modules may further include a synchronization module, executed by the processor that synchronizes the video, the first user data, the second user data, and the video sensor data to identify the corresponding first user data, the corresponding second user data, and the corresponding video sensor data for the any given duration. The system may further include a central network computing device that includes data from prior scenes and shoots that are specific to the video production, a location data, and weather information from the shoots.

In yet another aspect, a system for automatically generating notes for a multimedia content that is specific to a video production based on a user context is provided. The system includes a first audio capturing device adapted to be attached to a first user. The first audio capturing device captures a first audio. The system further includes a second audio capturing device adapted to be attached to a second user. The second audio capturing device captures a second audio. A first audio sensor is coupled to the first audio capturing device. The first audio sensor captures a first user data that includes a time series of a location data, a direction data, and an orientation data associated with the first user. A second audio sensor is coupled to the second audio capturing device. The second audio sensor captures a second user data that includes a time series of a location data, a direction data, and an orientation data associated with the second user. The system further includes a video capturing device that captures a video associated with the first user and the second user, and a video sensor embedded in the video capturing device. The video sensor captures a video sensor data that includes a time series of a location data, a direction data, an orientation data, and a position of the first user and the second user being recorded. The system further includes a memory unit that stores instructions; a database operatively connected to the memory unit; and a processor, when configured by the instructions, executes a set of modules.

The set of modules include a sensor data obtaining module when executed by the processor obtains the first user data, the second user data, and the video sensor data; an identification module when executed by the processor identifies for any given duration associated with the first audio, the second audio, or the video, corresponding first user data, corresponding second user data, and corresponding video sensor data; an annotation module when executed by the processor annotates at least one of the first audio, the second audio and the video with the corresponding first user data, the corresponding second user data, and the corresponding video sensor data to obtain an annotated multimedia content; a comparison module when executed by the processor identifies that performs a comparison of a data pattern of the annotated multimedia content with data patterns that correspond to one or more predefined sections of a script stored in the database to obtain a recommended section. The one or more predefined sections are specific to the video production. The data pattern includes a first user data, a second user data and a video sensor data associated with a section of the annotated multimedia content.

The set of modules further include a classification module when executed by the processor automatically classifies the annotated multimedia content by associating the annotated multimedia content with the recommended section; and a generation module when executed by the processor automatically generates notes for the recommended section of the annotated multimedia content from the first user data, the second user data, and the video sensor data that are associated with the recommended section, and the predefined data based on the comparison. The script may include identities, dialogues, activities, characters, locations, directions, orientations, positions, movements, scenes, and themes associated with the first user and the second user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a table view of one or more sensor data specific to one or more users being recorded and stored in the database of FIG. 2 of the video production system of FIG. 1 according to an embodiment herein;

FIG. 4 illustrates predefined sections for the video production stored in the database of FIG. 2 of the video production system of FIG. 1 according to an embodiment herein;

DETAILED DESCRIPTION

Figure 1:
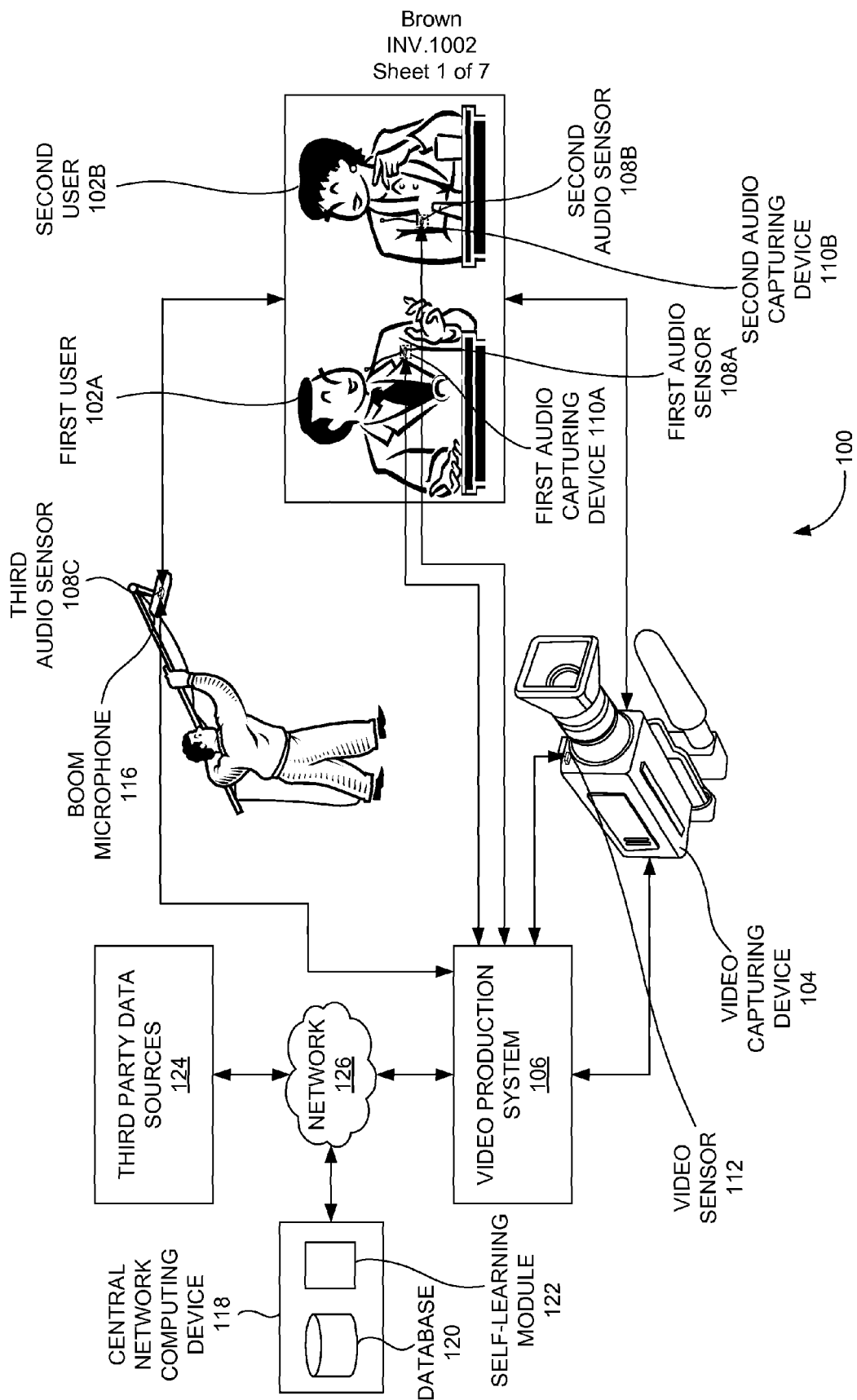
FIG. 1 is a system diagram illustrating an interaction being recorded by a video capturing device and one or more audio capturing devices to annotate, generate notes, and classify one or more sections of multimedia content specific to a video production using a video production system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for accurately annotating multimedia content with useful and accurate data, and automatically classifying one or more sections in the annotated multimedia content, thus allowing users of the annotated multimedia content being classified to quickly and accurately organize and search for a specific content based on a wide variety of features. The embodiments herein achieve this by providing a video production system that (a) obtains one or more times series sensor data from one or more audio and video sensors, audio and video feeds, and additional data feeds obtained from external sensors, (b) identifies, for any given duration associated with audio, video, corresponding first user data, corresponding second user data, and corresponding video sensor data, (c) annotates at least one of the audio and the video, corresponding first user data, corresponding second user data, and corresponding video sensor data to obtain an annotated multimedia content, (d) performs a comparison of a data pattern of the annotated multimedia content with data patterns that correspond to one or more predefined sections to obtain a recommended section, and (e) automatically classifies the annotated multimedia content by associating the annotated multimedia content with one or more recommended sections. The one or more predefined sections are specific to the video production. The video production system learns the pattern annotation, classification from training data (including prior shoots and video productions), and further generates notes specific to (i) current video production, (ii) the one or more recommended sections; and/or (iii) one or more user-suggested sections. Referring now to the drawings, and more particularly to FIGS. 1 through 7, where similar reference characters denote corresponding features consistently throughout the figures, there are shown preferred embodiments.

FIG. 1 illustrates a system 100 showing an interaction between a first user 102A and a second user 102B that is being recorded by a video capturing device 104 and one or more audio capturing devices 110A, 110B to annotate, generate notes, and classify one or more sections of multimedia content specific to a video production using a video production system 106 according to an embodiment herein. The system 100 further includes a first audio sensor 108A coupled to a first audio capturing device 110A attached to the first user 102A, a second audio sensor 108B coupled to a second audio capturing device 110B attached to the second user 102B, a video sensor 112 embedded in the video capturing device 104, and a boom microphone 116 that includes a third audio sensor 108C. The system 100 further includes third party data sources 124 and a central network computing device 118 that includes a database 120 and a self-learning module 122. The system 100 further includes a network 126 that enables the video production system 106, the central network computing device 118, and the third party data sources 124 to communicate with each other.

The first user 102A and the second user 102B may either be interacting with each other or with other audiences (or users) in an event or an activity. The event or the activity may include, but is not limited to, a scene being shot for a movie, a television show, and/or a sporting event, a video game, an advertisement, a seminar, an act, a drama, etc. The first audio sensor 108A that is coupled to the first audio capturing device 110A captures a first user data that includes a time series of the location data, direction data, and orientation data associated with the first user 102A. The first audio capturing device 110A captures a first audio. Similarly, the second audio sensor 108B that is coupled to the second audio capturing device 110B captures a second user data that includes a time series of the location data, direction data, and orientation data associated with the second user 102A. The second audio capturing device 110B captures a second audio. The first audio and the second audio are specific to the first user 102A, the second user 102B, an audience, or combinations thereof, in one example embodiment. The first audio capturing device 110A and the second audio capturing device 110B may be configured as any of a microphone and an audio recorder such as tape recorder, etc., in another example embodiment.

The video sensor 112 embedded in the video capturing device 104 captures the video sensor data that includes a time series of the location data, direction data, orientation data, and a position of the first user 102A and the second user 102B being recorded. Similarly, the video capturing device 104 captures video associated with the first user 102A and the second user 102B and transmits video to the video production system 106. The video capturing device 104 may be configured as any of a video camera, a digital camera, a camcorder, a mobile communication device, in one example embodiment. The system 100 may further include additional video capturing devices to capture video from multiple angles in other embodiments. The boom microphone 116 that includes the third audio sensor 108C records audio data associated with the first user 102A and the second user 102B. The boom microphone 116 is a multi-channel sound recorder used by one or more sound engineers or one or more camera operators to record audio (for better clarity) associated with the first user 102A and second user 102B using the third audio sensor 108C. Each of the sensors (e.g., the first audio sensor 108A, the second audio sensor 108B, the third audio sensor 108C, and the video sensor 112) are assigned a unique identifier to identify data aggregated from the first audio sensor 108A, the second audio sensor 108B, the third audio sensor 108C, and the video sensor 112 at the video production system 106 that classifies the one or more sections of the annotated multimedia content, in one example embodiment.

The video production system 106 comprises at least one of a personal computer, a laptop, a tablet device, a smartphone, a mobile communication device, a personal digital assistant, or any other such computing device, in one example embodiment. The video production system 106 (i) receives time series data from the first audio sensor 108A, the second audio sensor 108B, the third audio sensor 108C, and the video sensor 112, (ii) identifies, for any given duration associated with the first audio, the second audio or the video, (a) corresponding first user data, (b) corresponding second user data, and (c) corresponding video sensor data, (iii) annotates at least one of the first audio, the second audio, and the video with (a) the corresponding first user data, (b) the corresponding second user data, and (c) the corresponding video sensor data to obtain an annotated multimedia content, (v) performs a comparison of a data pattern of the annotated multimedia content with data patterns that correspond to one or more predefined sections of a script to obtain one or more recommended sections, and (vi) automatically classifies the annotated multimedia content by associating the annotated multimedia content with the one or more recommended sections. The predefined data is specific to the video production, in one example embodiment. The data pattern includes a first user data, a second user data, and a video sensor data associated with the one or more recommended sections of the annotated multimedia content.

The video production system 106 classifies annotated multimedia content based on information (stored in the database 120) obtained from (i) the central network computing device 118, and (ii) the third party data sources 124, in one example embodiment. The information obtained from the database 120 of the central network computing device 118 may include, but is not limited to, training data and data from other scenes and shoots, etc., in another example embodiment. The information obtained from the third party data sources 124 include, but is not limited to, weather, mapping, location-based data which serves as the basis for annotating video based on time, date, location, and other derived features of the data so that notes are generated (either online or offline during the process of annotation and classification of the annotated multimedia content using the one or more recommended sections).

The information further includes user-supplied corrections (e.g., notes from a script for a shoot of a scene), in yet another example embodiment. The script may be related to a current video production or a prior video production. The information obtained from (a) the central network computing device 118 and (b) the third party data sources 124, enables the video production system 106 to (i) classify one or more sections of the annotated multimedia content in a more automated manner, and (ii) learn a pattern of annotating multimedia content, generating notes for one or more recommended sections in the annotated multimedia content, and classifying the annotated multimedia content by associating the annotated multimedia content with the one or more recommended sections based on the suggested notes and the information. The video production system 106 may only annotate the video, the corresponding first user data, the corresponding second user data, and corresponding video sensor data (without any audio data) to obtain an annotated multimedia content, in one example embodiment.

The video production system 106 learns the pattern of annotating multimedia content, generating notes for one or more sections in the annotated multimedia content based on one or more inputs provided by the self-learning module 122. The video production system 106 learns the pattern of annotating multimedia content based on (i) one or more recommended sections, (ii) one or more user-suggested sections, and/or (iii) previously annotated multimedia content. The one or more inputs may be based on the information obtained from the database 120 and the third party data sources 124. The one or more inputs include a generation of notes with specific data patterns, suggestions to annotate one or more recommended sections, and classifying the one or more recommended sections based on a comparison of a data pattern of the annotated multimedia content with data patterns that correspond to one or more predefined sections to obtain the one or more recommended sections.

When the one or more recommended sections are obtained and displayed to a user and do not correlate with a user's intent or user context, the user may suggest his/her own user-suggested sections that can be associated with the annotated multimedia content. In other words, one or more user-suggested sections are processed from the user and are associated with the annotated multimedia content over the one or more recommended sections (that are recommended by the video production system 104). The one or more user-suggested sections are recommended by the user, when the one or more recommended sections do not match or correlate with user context (or user intent).

Figure 2:
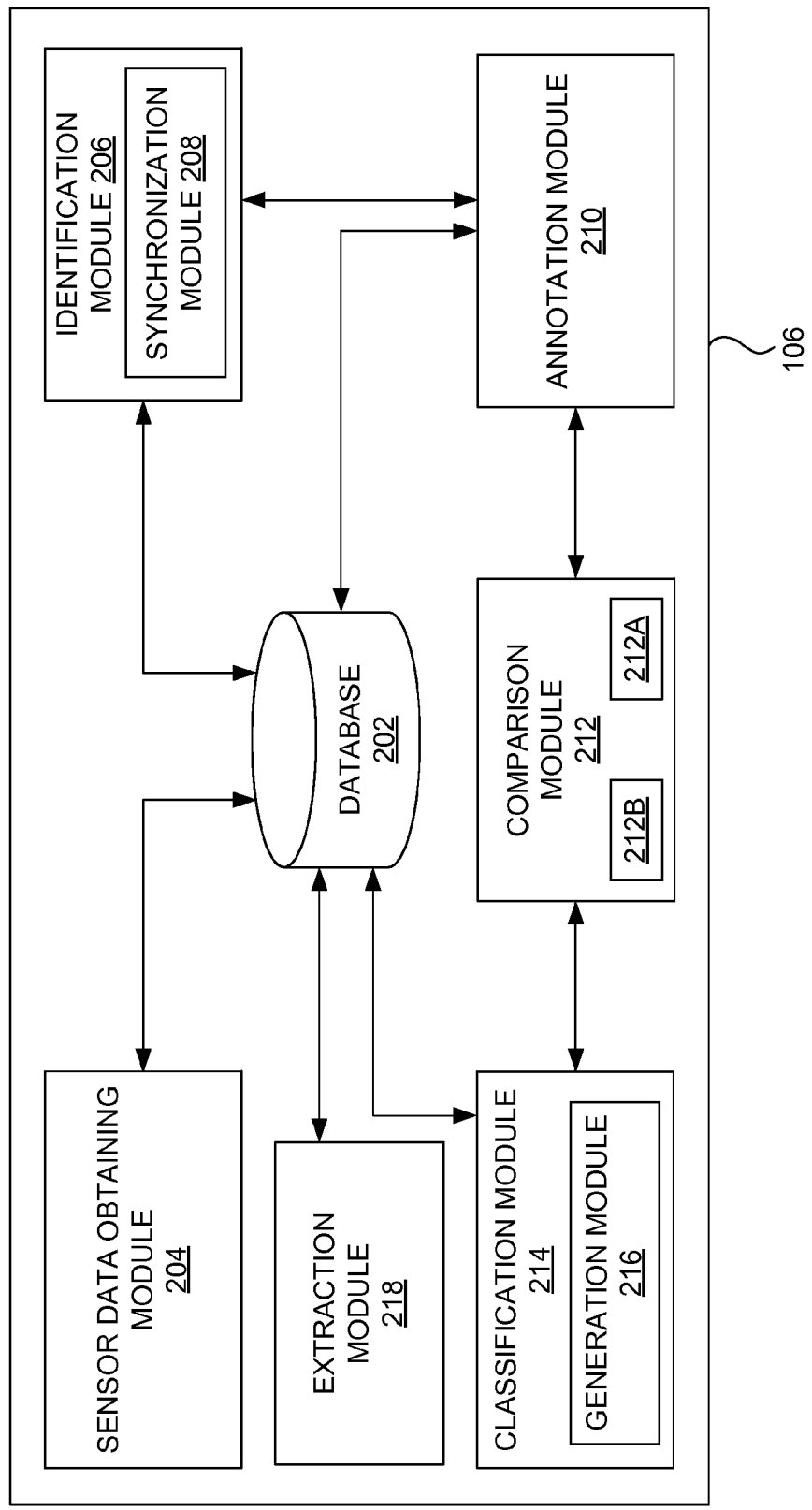
FIG. 2 is a block diagram of the video production system of FIG. 1 according to an embodiment herein.

FIG. 2, with reference to FIG. 1, illustrates the video production system 106 according to an embodiment herein. The video production system 106 includes a database 202, a sensor data obtaining module 204, an identification module 206 that includes a synchronization module 208, an annotation module 210, a comparison module 212 that includes a weight assigning module 212A and a recommendation module 212B, a classification module 214 that includes a suggestion module 216, and an extraction module 218. The video production system 106 further includes a processor (e.g., a CPU 10 of FIG. 6), and a memory (e.g., a memory 14 of FIG. 6) that stores the database 202 and instructions to configure the processor. The processor when configured by the instructions executes the sensor data obtaining module 204, the identification module 206, the synchronization module 208, the annotation module 210, the matching module 212, the classification module 214, and the suggestion module 216.

The database 202 stores information including time series data from the first audio sensor 108A, the second audio sensor 108B, the third audio sensor 108C, and the video sensor 112, in one example embodiment. The database 202 stores information obtained from (i) the central network computing device 118, (ii) the third party data sources 124, and (iii) other additional sensors (not shown in FIG. 2) that wirelessly communicate with the video production system 106, in one example embodiment.

The sensor data obtaining module obtains (i) a first user data that includes a time series of the location data, direction data, and orientation data associated with the first user 102A from the first audio sensor 108A, (ii) a second user data that includes a time series of the location data, direction data, and orientation data associated with the second user 102B, from the second audio sensor 108C, audio data (which may be an optional) associated with the first user 102A and the second user 102B from the third audio sensor 108C, and video sensor data that includes a time series of the location data, direction data, orientation data, and the position of the first user 102A and the second user 102B being recorded.

The identification module 206 identifies, for any given duration associated with the first audio, the second audio, or the video, (i) corresponding first user data, (ii) corresponding second user data, and (iii) corresponding video sensor data. The synchronization module 208 synchronizes at least a portion of the time series data obtained from the first audio sensor, and the time series data obtained from the second audio sensor, with a corresponding time series data obtained from the video sensor 112 to obtain a synchronized multimedia content. The synchronization module 208 may further synchronize at least a portion of the time series data obtained from the first audio sensor, the time series data obtained from the second audio sensor, and time series data obtained from the third audio sensor 108C, with a corresponding time series data obtained from the video sensor 112, in one example embodiment. For example, for a video and film production with data feeds from several audio channels and several cameras shooting different angles, these data feeds are gathered from multiple audio channels and several cameras and process various files from multiple memory cards from the various sound and camera operators. The synchronization module 208 synchronizes through a combination of absolute timestamps or relative time markings, such as the clapping of a slate at the beginning of a shot. The slate itself may have handwritten notes with scene information and date. The synchronization module 208 may further add a data feed that is also time stamped, either absolute with real time or relative to camera or sound device clocks. In either case, once the start times of the various media files are synchronized to a common clock using the synchronization module 208, the data feeds are in correlation with the other content (e.g., content from the data patterns stored in the database 202).

The annotation module 210 annotates at least one of one or more segments of the first audio, one or more segments of the second audio, and one or more segments of the video with at least one of the corresponding first user data, the corresponding second user data, and the corresponding video sensor data to obtain an annotated multimedia content. The one or more segments refer to one or more timestamps in the first audio, the second audio, and the video. The annotation module 210 performs annotation and classification of the annotated multimedia content by associating the one or more recommended sections or the one or more user-suggested sections with human readable notes and other searchable data based on a set of rules. In one embodiment, the one or more recommended sections of the annotated multimedia content are obtained based on the set of rules. The set of rules are stored in the database 202, in one example embodiment. The set of rules are obtained from a user, in another example embodiment. The annotation module 210 may only annotate the video, the corresponding first user data, the corresponding second user data, and the corresponding video sensor data (without any audio data) to obtain an annotated multimedia content, in one example embodiment.

These notes can be output in a format that video editing systems can recognize as annotations linked to specific points in each audio/video file. Examples of the set of rules may include: (i) when the first user 102A and the second user 102B are approaching towards each other and expressing feelings (which are captured either captured by the external sensors, or by the video sensor 112), that particular section specific shoot may be classified as a romance scene, (ii) when the first user 102A and the second user 102B are hitting each other and expressing perspiration or tiredness (which are captured either by the external sensors, or by the video sensor 112), that particular section specific shoot may be classified as an action scene and corresponding section may be associated with the annotated multimedia content. The set of rules may be defined by a user (e.g., a manufacturer, a producer, a director, a film editor, etc.), which may include information such as location data (e.g., where a scene is shot), a position data (e.g., a position of the first user 102A, and the second user 102B when the first user 102A and the second user 102B are hitting each other and expressing perspiration or tiredness), an audio data (e.g., attributes of an audio associated with the first user 102A and the second user 102B), a video sensor data (e.g., direction data, orientation data, etc). When a location data, a position data, a video sensor data, and an audio sensor data of the scene from the annotated multimedia content matches information specific to at least one rule from the set of rules, then the annotated multimedia content may be classified as the action scene.

The comparison module 212 performs a comparison of a data pattern of the one or more sections of the annotated multimedia content with data patterns that correspond to one or more predefined sections of the script stored in the database 202 to obtain one or more recommended sections. The predefined sections are specific to the video production, in one example embodiment. The data pattern includes a first user data, a second user data, and a video sensor data associated with the one or more recommended sections of the annotated multimedia content. The data pattern includes information related to the first user data, the second user data, and the video sensor data. One or more weights are assigned (or allocated) to the first user data, the second user data, and the video sensor data. The one or more weights are assigned using the weight assigning module 212A. The weight assigning module 212A establishes a quantitative weight factor associated with at least one of the video sensor data associated with the video, modifies the quantitative weight factor associated with the at least one of the video sensor data associated with the video to obtain a modified weight factor such that a user-suggested section becomes prioritized over the recommended section upon the comparison being performed based on the modified weight factor. A modified recommended section is determined (by the recommendation module 212B) for a subsequent video to be recorded at a subsequent time based on the modified weight factor. The data pattern with the weights associated with the one or more sections of the annotated multimedia content is compared with each of the first user data, the second user data, and the video sensor of the one or more predefined sections stored in the database 202.

The one or more recommended sections are specific to one or more time durations in the annotated multimedia content. For example, the annotated multimedia content may be five minutes in duration. A first recommended section of the annotated multimedia content may be initially one minute in duration. A second recommended section of the annotated multimedia content may be the next two minutes in duration, and a third recommended section of the annotated multimedia content may be the subsequent two minutes in duration after the second section. The first recommended section, the second recommended section, and the third recommended section may include one or more scenes, one or more shoots, and/or one or more events/activities related to each other, in one example embodiment. The first recommended section, the second recommended section, and the third recommended section may include one or more scenes, one or more shoots, and/or one or more events/activities that are different from each other, in another example embodiment. For example, the first recommended section may be related to a sports scene for a movie. The second recommended section may include an action scene in the movie. Similarly, the third recommended section may include a wedding scene in the movie. Likewise, a first user-suggested section may be one or more scenes, one or more shoots, or one or more events/activities related to each other, in one example embodiment. The first user-suggested section, the second user-suggested section, and the third user-suggested section may include one or more scenes, one or more shoots, or one or more events/activities that are different from each other, in another example embodiment.

In a preferred embodiment, performing a comparison or matching to a specific production can be facilitated by setting up the video production system 106 with a script or production information that lists characters, locations, scenes, subjects, and themes. The self-learning module 122 provides the one or more inputs to the video production system 106 based on the comparison or the matching, by which a classification of the annotated multimedia content is performed. The classification is performed by fitting weights to the feature vector. The classification of the annotated multimedia content is determined based on one or more features from the feature vector.

In the context of identifying characters, locations, and scenes, the sensor data is used to add more meaningful notes (e.g., which may be digital notes) such as using orientation sensing to create more detailed notes like "character A facing character B at location X" or "character A approaching camera Z at a distance when M meters away" or "character B talking to character A" or "character B talking and facing camera Z." Character A refers to the first user 102A and the character B refers to the second user 102B. Similarly, camera Z refers to the video capturing device 104.

Other sensor data can be trained and classified in the same way for meaningful classes such as using health-related sensors including heart rate, perspiration, respiration, etc. to create notes such as "character A is more agitated and breathing heavily."

Other sensor data can be used to form patterns that are recognized related to specific events independent of clock-time synchronization. For example, when character A strikes character B or when a gun fires or when a race begins, etc. Event markers that are meaningful to the video production can be classified in the same way when there is a pattern in the sensor data and when there is a user who can train the video production system 106 by confirming the initial predictions of the video production system 106. These notes will be extremely valuable in helping any production. For instance, loads of video and audio data are streamed and synchronized together to perform a comparison of data patterns of an annotated multimedia content with data patterns stored in the database 202 to obtain a recommended section. This recommended section enables a classification of the annotated multimedia content. This classification makes the audio and video data searchable with respect to the classification that is most relevant to the production.

The data feed is a time series of sensor data from the first audio sensor 108A, the second audio sensor 108B, the third audio sensor 108C, and the video sensor 112, including orientation and location of the first user 102A and the second user 102B, but also any other sensor data that may be available directly from the devices or indirectly derived or discovered through the network 126 based on sensor data and location. Additional data inputs in this time series can be waveforms in the sound, facial, and image recognition in the video frames, and optical character recognition of the slate at the beginning of the shot, in one example embodiment. In any case, this set of data is characterized as a time series of vectors, where each point in time is a vector that includes the available sensor data and derived data from media and the network 126.

In an example scenario, when the video production system 106 is not monitored or supervised, where clusters of features that appear similar, or vectors that have a small distance between them, the prediction is based on the data (e.g., an audio data, a video data, etc.) that they have in common. These clusters of features correlate with characters, scenes, and locations in a completely unsupervised manner, with no knowledge of the subject matter. The video production system 106 learns the pattern when the producer, or director, or editor trains the video production system 106 when the multimedia content is associated with attributes that are meaningful and specific to the video production. This can be performed with a mobile application or other software that presents a frame or clip with associated data and asks for confirmation or notes on the character, scene, and subject. The video production system 106 learns the pattern of annotating multimedia content based on one or more recommended sections, one or more user-suggested sections, and previously annotated multimedia content. The video production system 106 is trained by a user (e.g., the producer, or director, or editor, etc.), when the user provides one or more inputs to one or more recommended sections, or modifies the one or more recommended sections. The set of rules may be further modified based on how the video production system 106 learns the pattern and how it is trained by the user, in one example embodiment. A new set of rules may be generated by the video production system 106 in real time or near real time as and when a classification of an annotated multimedia content is determined, in another example embodiment.

The classification module 214 classifies the annotated multimedia content based on the comparison or a match between data patterns of one or more sections of the annotated multimedia content and the one or more predefined sections stored in the database 202 specific to a video production. The one or more sections include a first section, a second section, and a third section of the annotated multimedia content, in one example embodiment. The video production system 106 generates a list of prioritized predefined sections based on the comparison. The generation module 216 may also generate the list of prioritized predefined sections from the one or more predefined sections based on the comparison, in one example embodiment. The video production system 106 may include a prioritization module (not shown in FIG. 2) that generates the list of prioritized predefined sections from the one or more predefined sections based on the comparison, in another example embodiment. The one or more recommended sections are in an order of a high priority to a low priority, or vice versa. The top recommended section is a highest priority section from the list of prioritized predefined sections, in one example embodiment. The bottom recommended section is a highest priority section from the list of prioritized predefined sections, in another example embodiment.

As described above, one or more user-suggested sections may be processed from the user, when (i) the one or more recommended sections are obtained and displayed to a user, and (ii) do not correlate with a user intent or user context. The user may suggest his/her own user-suggested sections that can be associated with the annotated multimedia content. In other words, the one or more user-suggested sections are processed from the user and the annotated multimedia content is associated with the one or more user-suggested sections over the one or more recommended sections (that are recommended by the video production system 104). The annotated multimedia content may be associated with the user-suggested section instead of the recommended section when the user-suggested section is different from the recommended section.

The one or more recommended sections are recommended by the recommendation module 212B, in one example embodiment. The one or more user-suggested sections are recommended by the user, when the one or more recommended sections do not match or correlate with user context (or user intent), in one example embodiment. The video production system 106 may then modify a weight (e.g., using the weight assigning module 212A) to obtain a modified weight associated with at least one of the first audio sensor data, the second audio sensor data, and the sensor video data associated with the video to prioritize the user-suggested sections over the recommended sections when the comparison is performed based on the modified weight, and may further determine one or more recommended sections for a subsequent video to be recorded at a subsequent time based on the weight.

This information may be used by the video production system 106 to be trained by the user or learn, by itself, from the pattern of annotation, recommended sections, and user-suggested sections to predict one or more recommended sections for future video productions. The one or more recommended sections may be obtained based on the set of rules. The predefined sections specific to the video production includes a script associated with the video. The script includes at least one of identities, dialogues, activities, characters, locations, directions, orientations, positions, movements, scenes, and themes associated with the first user 102A and the second user 102B.

The generation module 216 automatically generates notes for the one or more recommended sections and/or the one or more user-suggested sections of the annotated multimedia content from at least one of the first user data, the second user data, and the video sensor data that are associated with the one or more sections, and the predefined sections based on the comparison and the weight. The notes may also be generated when at least a portion of the data patterns of one or more sections specific to the annotated multimedia content match with at least a portion of the data patterns of one or more predefined sections specific to a video production (or the annotated multimedia content) stored in the database 202. The notes may include, but are not limited to, identities of the first user 102A and the second user 102B, a line in a script at which the first user 102A or the second user 102B is talking, activities of the first user 102A or the second user 102B, character information, scene information, and event information. The activities of the first user 102A and/or the second user 102B include, but are not limited to (i) the first user 102A facing the second user 102B at a location, (ii) the first user 102A approaching the video capturing device 104 at a certain distance from the first user 102A, (iii) the second user 102B talking to the first user 102A, (iv) the second user 102B talking and facing the video capturing device 104, and (v) the first user's or second user's health-information, in one example embodiment.

The video production system 106 further suggests notes for annotating the current video production, classifies the annotated multimedia content by associating the annotated multimedia content with at least one of the one or more recommended sections and/or the one or more user-suggested sections, and suggests notes for annotating the future video production, suggests classifications for future multimedia content for video production, and recommends one or more subsequent sections for the further annotated multimedia content.

The video production system 106 may further obtain additional sensors data from one or more additional sensors that sense identities or health-related information such as heart rates, perspirations, and respirations of the first user 102A and the second user 102B. The data pattern (as described above) further includes the additional sensor data from the one or more additional sensors that is specific to the one or more recommended sections or the one or more user-suggested sections of the annotated multimedia content. Further additional data from prior scenes and shoots that are specific to the video production, the location data, and weather information may be obtained from the central network computing device 118. The weather information may be associated with the prior scenes and shoots, in one example embodiment. The weather information may be associated with the current scenes and current shoots, in another example embodiment. The synchronization module 208 may further annotate the classified annotated multimedia content with the additional sensors data and the additional data obtained from the central network computing device 118, and the subsequent steps of comparison and classification of the classified annotated multimedia content, and generation of notes may be performed. Thus, the video production system 106 may perform annotation of the multimedia content that may include a combination of the first audio, the second audio, and the video; classification of the annotated multimedia content by associating the annotated multimedia content with the one or more recommended sections and/or the one or more user-suggested sections; and generation of notes for the one or more recommended sections and/or the one or more user-suggested sections, which is further based on prior multimedia content having predefined sections, user information, and classifications associated with videos that were captured by the video production in the past.

In one embodiment, the sensor data obtaining module 204, the identification module 206, the synchronization module 208, the annotation module 210, the comparison module 212 that includes the weight assigning module 212A and the recommendation module 212B, the classification module 214 that includes the suggestion module 216, and the extraction module 218 are implemented as a logically self-contained part of a software program that when executed by the processor (e.g., a CPU 10 of FIG. 6) perform one or more functions as described above. In another embodiment, the sensor data obtaining module 204, the identification module 206, the synchronization module 208, the annotation module 210, the comparison module 212 that includes the weight assigning module 212A and the recommendation module 212B, the classification module 214 that includes the suggestion module 216 and the extraction module 218 are implemented as a self-contained hardware component within or operatively connected to the video production system 106.

FIG. 3, with reference to, FIGS. 1 through 2, illustrates a table view of one or more sensor data specific to one or more users 102A, 102B being recorded and stored in the database 202 of the video production system 106 of FIG. 2 according to an embodiment herein. The database 202 includes a time field 302, a sensor data field 304, a first user data field 306, a second user data 308, a video sensor data field 310, and an external sensor data field 312. The time field 302 includes time intervals (e.g., T1, T2, . . . T$_N$, etc.). The sensor data field 304 includes time series data such as, but not limited to, location data, direction data, orientation data, and position data, etc. The first user data field 306 includes a time series data associated with the first user 102A being captured by the first audio sensor 108 at one or more time intervals (e.g., at time interval T1). The time series data of the first user 102A for the time interval T1 may be "the location data—the first user 102A is 2 mts away from the video capturing device 104", "the direction data—the first user 102A facing the second user 102B", "the orientation data—the first user 102A facing the second user 102B from a location X", and "the external sensor data—the first user 102A respiration rate is high". Similarly, the second user data field 308 includes the time series data of the second user 102B for the same time interval T1 such as "the location data—the second user 102B 3 mts away from the video capturing device 104", "the direction data—the second user 102B facing the first user 102A", "the orientation data—the second user 102B facing the first user 102A from a location Y". The video sensor data field 310 includes data of the first user 102A and the second user 102B for the same time interval T1. The data includes "the location data—the first user 102A 2 mts away, and the second user 102B 3 mts away from the video capturing device 104", "the direction data—the first user 102A and the second user 102B facing each other", "the orientation data—the first user 102A and the second user 102B facing each other from locations X and Y with reference to the video capturing device 104", and "the position data—the first user 102A 2 mts away from the video capturing device 104 from the location X, and the second user 102B 3 mts away from the video capturing device 104 from the location Y". The orientation data may also include video sensor data such as a video capturing device inclination angle (e.g., the video capturing device 104 that is facing upwards and captures a video of the first user 102A and the second user 102B at an angle of 60 degrees), and the distance of the video capturing device 104 from the first user 102A and the second user 102B (e.g., the video is capturing at a distance 2 meters away from the first user 102A and 3 meters from the second user 102B).

Although data associated with time intervals T2, T3 . . . T4 are not depicted in FIG. 3, it is to be understood that the data may include interaction between the first user 102A and/or the second user 102B with other subsequent users in the scene. Similarly, it is to be understood that the data may further include interaction between the subsequent users at different time intervals. This data may also be stored in the database 202.

Similarly, the first user data field 306, the second user data field 308, the video sensor data field 310, and the external sensor data field 312 may include subsequent location data, direction data, orientation data, and/or position for the time interval T$_N$ as depicted in FIG. 3.

FIG. 4, with reference to FIGS. 1 through 3, illustrates predefined sections of a script for the video production stored in the database 202 of FIG. 2 of the video production system 106 of FIG. 1 according to an embodiment herein. The predefined data is a script for a video production, in one example embodiment. The predefined data may be obtained from a slate itself that may include handwritten (or digital) notes with scene information and date, in another example embodiment. The predefined data may be in a raw and unstructured format (e.g., handwritten notes that are scanned and stored in the database 202), in yet another example embodiment. The predefined data may be in a structured format such that the specific attribute data like scene number, scene information, character information, location data, direction data, orientation data, position data, dialogues are automatically extracted (using the video production system 106) to identify a match, in yet a further example embodiment. The video production system 106 includes an extraction module 218 to automatically identify one or more specific attributes from the predefined data and extract the specific attribute data, in one example embodiment. The predefined sections/notes as depicted in FIG. 4 are correlated/compared with a data pattern of FIG. 3 to identify a match between each other. The data pattern includes the first user data, second user data, and video sensor data associated with the one or more sections of the annotated multimedia content.

Lines 6-7 from the predefined section indicate or represent one or more specific attributes such as location data (e.g., John 2 meters away from the video capturing device 104), direction data (e.g., John facing Smith), and character (e.g., job seeker). The one or more attributes from the predefined section are compared with one or more sensor data as depicted in FIG. 3 to identify a match. For example, the first user data from the first user data field 306, the second user data from the second user data field 308, and the video sensor data from the video sensor data field 310 are compared with the location data (e.g., John 2 meters away from the video capturing device 104), direction data (e.g., John facing Smith), and character (e.g., job seeker) for the time interval T1, T2, T3 . . . $T_N$ to identify the match.

The notes are generated specific to a section in the annotated multimedia content when the first user data from the first user data field 306, the second user data from the second user data field 308, and the video sensor data from the video sensor data field 310 match with at least one of the location data (e.g., John 2 meters away from the video capturing device 104), direction data (e.g., John facing Smith), and character (e.g., job seeker) for the time interval T1, T2, T3 . . . $T_N$ In this case, the notes generated include the first user data, the second user data, the video sensor data, the predefined data, and/or external sensor data that correspond to the time interval T1.

It is evident from the FIG. 4 that lines 19-26 are specific to the time interval $T_N$ of FIG. 3. Similarly, it is to be understood that similar notes may be generated specific to the Nth section in the annotated multimedia content when the first user data from the first user data field 306, the second user data from the second user data field 308, and the video sensor data from the video sensor data field 310 match with one or more attributes from the predefined notes. In one embodiment, the scene information (e.g., one or more attributes in lines 3-4 from the predefined section such as an interview of John with Smith) indicates a classification of the annotated multimedia content by associating the particular section in the annotated multimedia content. The same section of the annotated multimedia content may be classified as an introduction scene instead of an interview scene since the self-learning module 122 has learned (been trained) from the previously annotated and classified multimedia content which had similar lines of predefined section. The previously annotated and classified multimedia content may be specific to a video production and/or a third party.

Figure 5:
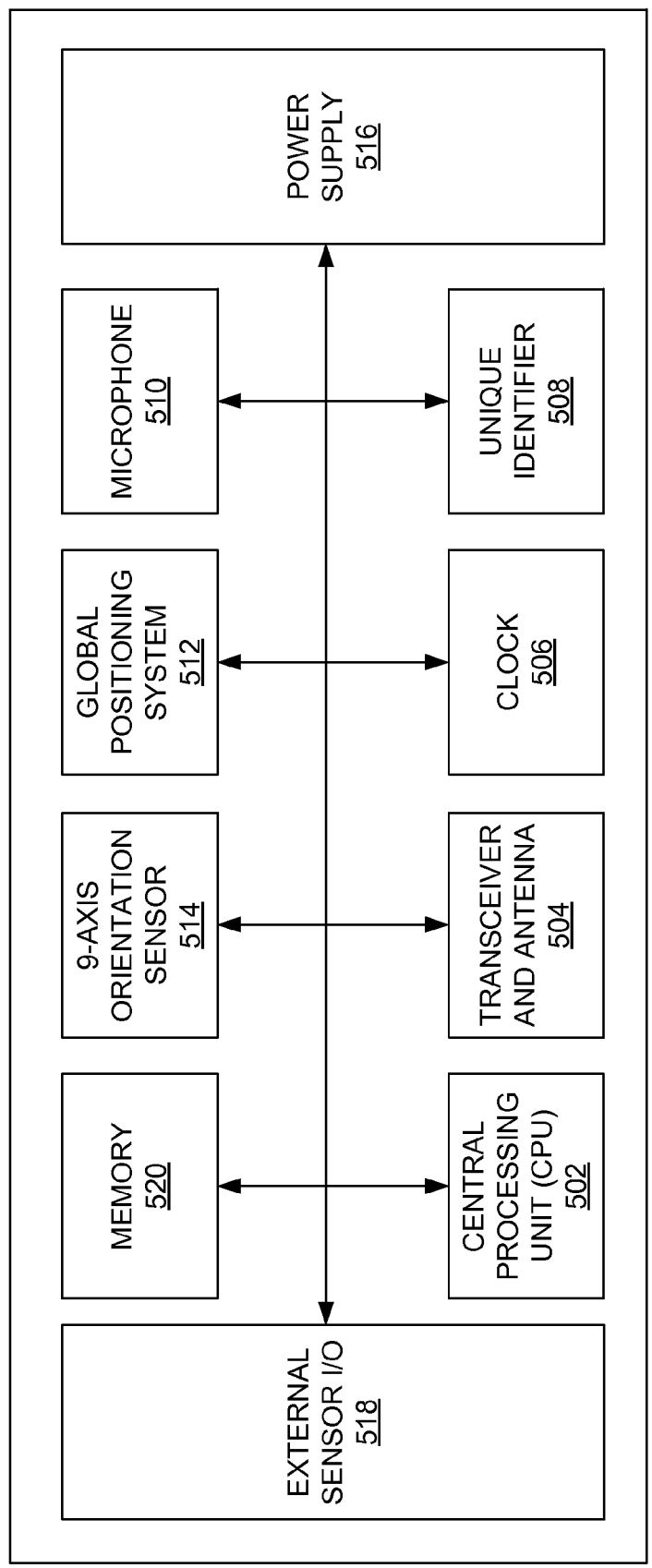
FIG. 5 is a block diagram of the various sensors of FIG. 1 according to an embodiment herein.

FIG. 5, with reference to FIGS. 1 through 4, illustrates a system block diagram of any of the first audio sensor 108A, the second audio sensor 108B, the third audio sensor 108C, and the video sensor 112 of FIG. 1 according to an embodiment herein. FIG. 5 depicts a central processing unit (CPU) 502, a transceiver and antenna 504, a clock 506, a unique identifier 508, a microphone 510, a global positioning system (GPS) 512, a 9-axis orientation sensor 514, a power supply unit 516, and an external sensor input/output (I/O) unit 518. The CPU 502 may be embodied as a microcontroller that is configured to execute instructions stored in a memory 520 including, but not limited to, an operating system, sensor I/O procedures, sensor fusion procedures for combining raw orientation data from multiple degrees of freedom in the orientation sensors to calculate absolute orientation, transceiver procedures for communicating with a receiver unit and determining for communications accuracy, power procedures for going into power saving modes, data aggregation procedures for collecting and transmitting data in batches according to a duty cycle, and other applications. The transceiver and antenna 504 is configured to transmit collected data and sensor node identification to a base station and may receive a beacon signal to synchronize timing with other sensor nodes, or to indicate standby or active modes of operation. The clock 506 tracks absolute time so that all data streams (e.g., data feeds that are being recorded) are synchronized and may be reset by a beacon signal or from the GPS 512 or other wireless signal.

The unique identifier 508 is an identifier uniquely associated with each of the sensors (e.g., the first audio sensor 108A, the second audio sensor 108B, the third audio sensor 108C, and the video sensor 112) and may be mapped to the first user 102A, the second user 102B, the video capturing device 104 (or other cameras) or users in the receiving data management application. The microphone 510 may be configured as a microelectromechanical systems (MEMS) microphone for synchronizing data streams (e.g., data feeds) from at least one sensor with other high quality audio signals from the audio and video recording devices used in the video production. The GPS 512 is configured to establish absolute location of the sensor, and may be made more precise through triangulation of Wi-Fi or beacon signals at known locations. The 9-axis orientation sensor 514 includes a 3-axis accelerometer, a 3-axis geomagnetic sensor, and a 3-axis gyroscope and is configured to calculate precise measurement of movement, direction, angular rate, and acceleration in three perpendicular axes. The power supply unit 516 may be configured as a battery and incorporates energy harvesting from motion, RF power, or other sources, etc. The external sensor I/O unit 518 enables the sensor to couple to additional external sensors which measure features of the first user 102A, and the second user 102B (e.g., heart rate, heart rate variability, blood pressure, respiration, perspiration, etc.) or the environment (e.g., temperature, barometric pressure, moisture or humidity, light, wind, presence of chemicals, etc.). The first audio sensor 108A, the second audio sensor 108B, the third audio sensor 108C, and the video sensor 112 may have rules stored in the memory 520 for determining duty cycles and sampling rates for data collection from multiple sensors. These sensors may send data wirelessly to the video production system 106 and the duty cycle and transmission rules can be reprogrammed by the video production system 106.

Figure 6:
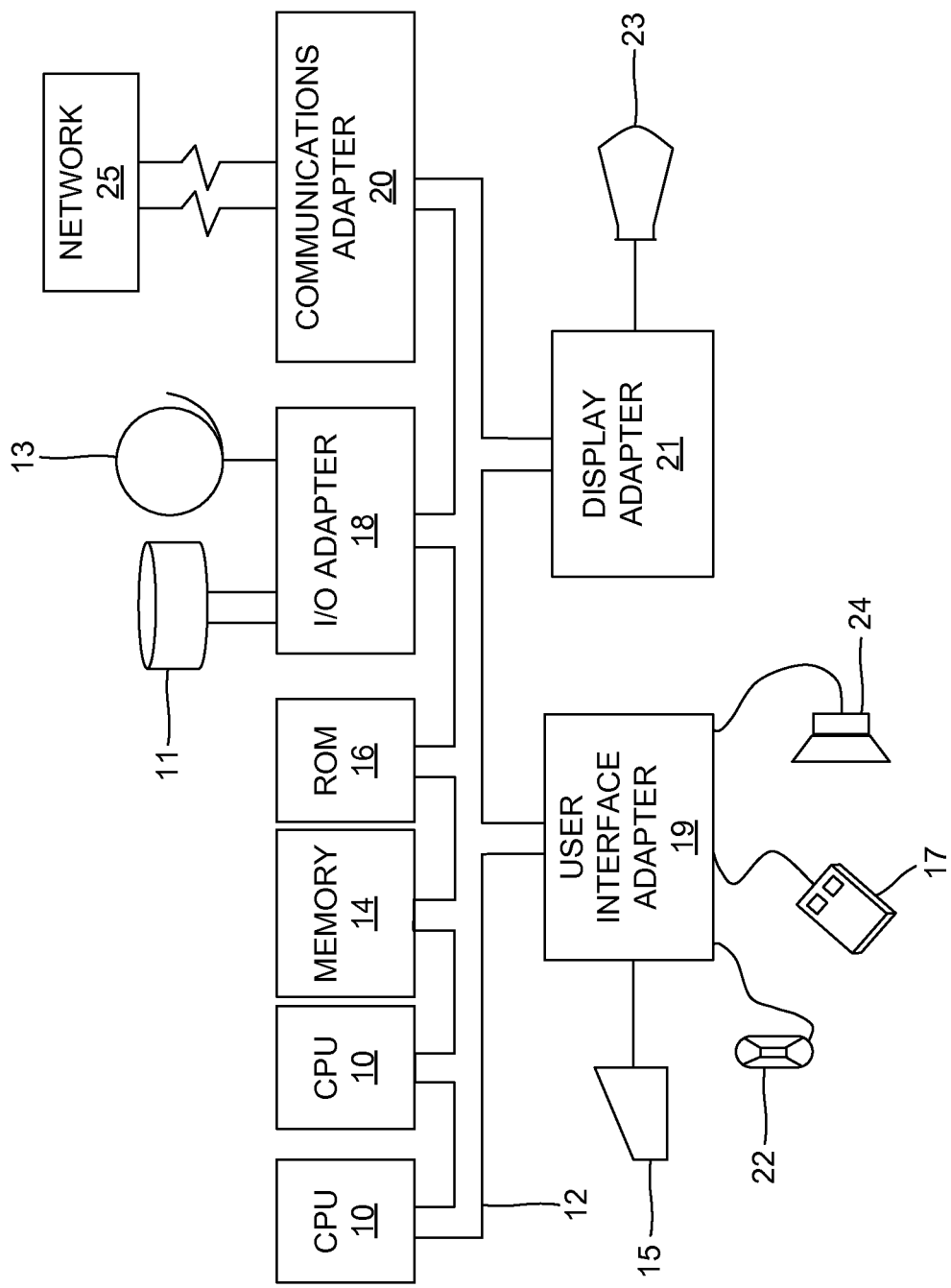
FIG. 6 is a computer system used in accordance with the embodiments herein.

FIG. 6, with reference to FIGS. 1 through 5, is a computer system used in accordance with the embodiments herein. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a memory 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein can include hardware and software embodiments. The embodiments that comprise software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
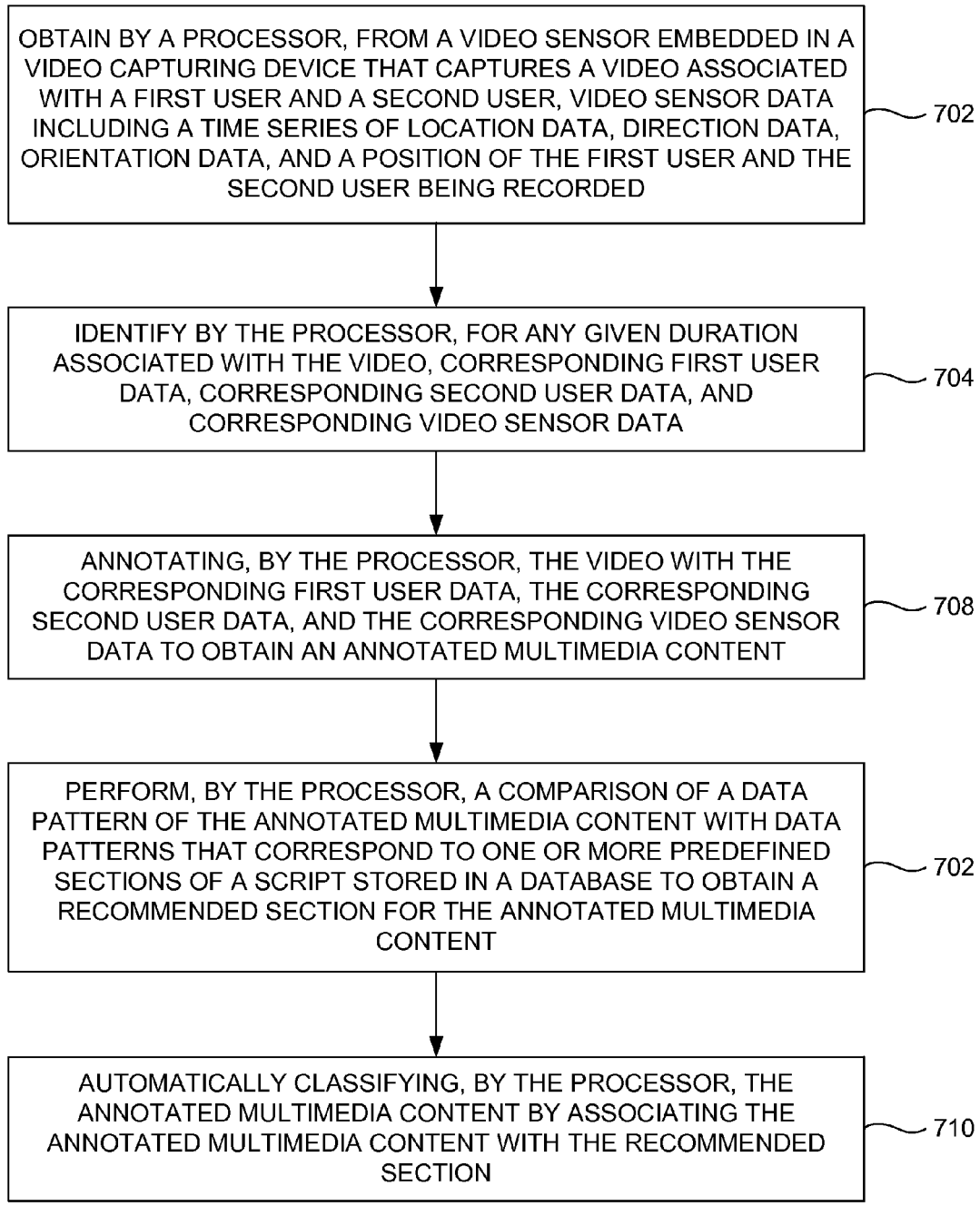
FIG. 7 is a flow diagram illustrating a method of automatically classifying multimedia content that is specific to a video production based on a user context using the video production system of FIG. 1 according to an embodiment herein.

FIG. 7, with reference to FIGS. 1 through 6, is a flow diagram illustrating a method of automatically classifying multimedia content that is specific to a video production based on a user context using the video production system 106 of FIG. 1 according to an embodiment herein. In step 702, video sensor data that includes a time series of location data, direction data, orientation data, and a position of the first user 102A and the second user 102B being recorded (e.g., using the video capturing device 104) is obtained (e.g., using the sensor data obtaining module 204) from the video sensor 112 by the processor (e.g., the CPU 10). Similarly, a first audio and a first user data corresponding to the first user, a second audio and a second user data corresponding to the second user may be obtained from the first audio sensor 108A and the second audio sensor 108B (e.g., using the sensor data obtaining module 204). In step 704, corresponding first user data, corresponding second user data, and corresponding video sensor data are identified (e.g., using the identification module 206 of FIG. 2) for any given duration. At least a portion of the time series data obtained from the first audio sensor 108A, and the time series data obtained from the second audio sensor 108A, with a corresponding time series data obtained from the video sensor 112 is used to obtain a synchronized multimedia content.

The synchronization module 208 may further synchronize at least a portion of the time series data obtained from the first audio sensor 108A, the time series data obtained from the second audio sensor 108B, and the time series data obtained from the third audio sensor 108C, with a corresponding time series data obtained from the video sensor 112, in one example embodiment.

In step 706, the video is annotated with the corresponding first user data, the corresponding second user data, and the corresponding video sensor data (e.g., using the annotation module 210 of FIG. 2) to obtain an annotated multimedia content. In step 708, a comparison of a data pattern of the annotated multimedia content with data patterns that correspond to one or more predefined sections of a script stored in the database 202 is performed (e.g., using the comparison module 212) to obtain a recommended section for the annotated multimedia content. The one or more predefined sections are specific to the video production. The data pattern includes first user data, second user data, and video sensor data associated with a section of the annotated multimedia content.

In step 710, the annotated multimedia content is automatically classified (e.g., using the classification module 214 of FIG. 2) by associating the annotated multimedia content with the recommended section. A list of prioritized predefined sections may be generated (e.g., the generation module 216 of FIG. 2) from the one or more predefined sections based the comparison. The recommended section is a highest priority section from the list of prioritized predefined sections. The recommended section is communicated to a user (e.g., using the recommendation module 212B). At least one user-suggested section may be received from the user, and the user suggestion section is processed by the processor (e.g., the CPU 10). The annotated multimedia content is associated with the user-suggested section instead of the recommended section.

A quantitative weight factor associated with the video sensor data associated with the video may be established (e.g., using the weight assigning module 212A). The quantitative weight factor associated with the video sensor data associated with the video may be modified (e.g., using the weight assigning module 212A) to obtain a modified weight factor such that the user-suggested section becomes prioritized over the recommended section upon the comparison being performed based on the modified weight factor. A modified recommended section is determined (e.g., using the recommendation module 212B) for a subsequent video to be recorded at a subsequent time based on the modified weight factor.

The script may include identities, dialogues, activities, characters, locations, directions, orientations, positions, movements, scenes, and themes associated with the first user 102A and the second user 102B. Notes for the recommended section or the user-suggested section of the annotated multimedia content may be automatically generated from any of the first user data, the second user data, and the video sensor data based on the comparison and/or the quantitative weight factor. The notes may include identities of the first user 102A and the second user 102B, a line in the script at which the first user 102A or the second user 102B is talking, character information, scene information, event information, etc. The activities of the first user 102A or the second user 102B may include the first user 102A facing the second user 102B, the first user 102A approaching the video capturing device 104 at a distance from the first user 102A, the second user 102B talking to the first user 102A, the second user 102B talking and facing the video capturing device 104, health information of the first user 102A or the second user 102B, etc.

Data such as identities or health-related information including heart rates, perspirations, and/or respirations of the first user and the second user may be obtained from an additional sensor. The data pattern may include the data from the additional sensor that is specific to the recommended section or the user-suggested section of the annotated multimedia content. The first user data, the second user data, and the video sensor data may further be synchronized (e.g., using the synchronization module 208) to identify the corresponding first user data, the corresponding second user data, and the corresponding video sensor data for the any given duration.

The recommended section of the annotated multimedia content may be obtained based on a set of rules that are stored in the database 202. Data from prior scenes and shoots that are specific to the video production, the location data, and weather information of the prior shoots (or current shoots) may be obtained (by the processor) from the central network computing device 118 of FIG. 1. An annotation of the video, a classification of the recommended section or the user-suggested section of the annotated multimedia content, and a generation of notes for the recommended section or the user-suggested section is further based on prior multimedia content including predefined data (or predefined sections of prior annotated multimedia content), user information, and classifications associated with videos that were previously captured by the video production.

The video production system 106 performs automatic annotation of multimedia content with rich contextual data that can be used to identify, cluster, and differentiate video and audio content. The video production system 106 learns the pattern of annotation, generation of notes, and automatically suggests the notes associated with video, identifying characters, scenes, locations, shoots and other useful content to speed the discovery and analysis of video content. The video production system 106 automatically suggests which camera angle or audio channel to use when multiple angles and channels are recording simultaneously.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of automatically classifying multimedia content that is specific to a video production based on a user context, said method comprising:

obtaining from a video sensor embedded in a video capturing device that captures a video associated with a first user and a second user, video sensor data comprising a time series of location data, direction data, orientation data, and a position of said first user and said second user being recorded;

identifying, for any given duration associated with said video, corresponding first user data, corresponding second user data, and corresponding video sensor data;

annotating said video with said corresponding first user data, said corresponding second user data, and said corresponding video sensor data to obtain an annotated multimedia content;

performing, by said processor, a comparison of a data pattern of said annotated multimedia content with data patterns that correspond to a plurality of predefined sections of a script stored in a database to obtain a recommended section for said annotated multimedia content, wherein said plurality of predefined sections are specific to said video production, and wherein said data pattern comprises first user data, second user data, and video sensor data associated with a section of said annotated multimedia content; and automatically classifying, by said processor, said annotated multimedia content by associating said annotated multimedia content with said recommended section.

2. The method of claim 1, further comprising generating a list of prioritized predefined sections from said plurality of predefined sections based said comparison, wherein said recommended section is a highest priority section from said list of prioritized predefined sections.

3. The method of claim 2, further comprising:
receiving at least one user-suggested section from a user:
processing said at least one user-suggested section from said user; and
associating said annotated multimedia content with said at least one user-suggested section instead of said recommended section.

4. The method of claim 3, further comprising:
establishing a quantitative weight factor associated with at least one of said video sensor data associated with said video;
modifying said quantitative weight factor associated with said at least one of said video sensor data associated with said video to obtain a modified weight factor such that said user-suggested section becomes prioritized over said recommended section upon said comparison being performed based on said modified weight factor; and
determining a modified recommended section for a subsequent video to be recorded at a subsequent time based on said modified weight factor.

5. The method of claim 4, wherein said script comprises at least one of identities, dialogues, activities, characters, locations, directions, orientations, positions, movements, scenes, and themes associated with said first user and said second user.

6. The method of claim 3, further comprising automatically generating notes for at least one of said recommended section or said user-suggested section of said annotated multimedia content from at least one of said first user data, said second user data, and said video sensor data based on said comparison and said quantitative weight factor, wherein said notes comprise at least one of identities of said first user and said second user, a line in said script at which said first user or said second user is talking, character information, scene information, and event information, and wherein said activities of said first user or said second user comprise at least one of said first user facing said second user, said first user approaching said video capturing device at a distance from said first user, said second user talking to said first user, said second user talking and facing said video capturing device, and health information of said first user or said second user.

7. The method of claim 3, further comprising obtaining data from at least one additional sensor that senses identities or health-related information comprising heart rates, perspirations, and respirations of said first user and said second user, wherein said data pattern comprises said data from said at least one additional sensor that is specific to at least one of said recommended section or said user-suggested section of said annotated multimedia content.

8. The method of claim 1, further comprising synchronizing said first user data, said second user data, and said video sensor data to identify said corresponding first user data, said corresponding second user data, and said corresponding video sensor data for said any given duration.

9. The method of claim 1, wherein said recommended section of said annotated multimedia content is obtained based on a set of rules that are stored in said database.

10. The method of claim 1, further comprising obtaining, from a central network computing device, data from prior scenes and shoots that are specific to said video production, said location data, and weather information of said shoots.

11. The method of claim 3, wherein an annotation of said video, a classification of said recommended section or said user-suggested section of said annotated multimedia content, and a generation of notes for said recommended section or said user-suggested section, is based on prior multimedia content comprising predefined data, user information, and classifications associated with videos that were previously captured by said video production.

12. A system for automatically classifying multimedia content that is specific to a video production based on a user context, said system comprising:
  a video capturing device that captures a video associated with a first user and a second user;
  a video sensor embedded in said video capturing device, wherein said video sensor captures a video sensor data comprising a time series of a location data, a direction data, an orientation data, and a position of said first user and said second user being recorded;
  a memory unit that stores instructions;
  a database operatively connected to said memory unit; and
  a processor, when configured by said instructions, executes a set of modules comprising:
    a sensor data obtaining module that obtains said first user data, said second user data, and said video sensor data;
    an identification module that identifies for any given duration associated with said video, corresponding first user data, corresponding second user data, and corresponding video sensor data;
    an annotation module that annotates said video with said corresponding first user data, said corresponding second user data, and said corresponding video sensor data to obtain an annotated multimedia content;
    a comparison module that performs a comparison of a data pattern of said annotated multimedia content with data patterns that correspond to a plurality of predefined sections of a script stored in said database to obtain a recommended section, wherein said plurality of predefined sections are specific to said video production, and wherein said data pattern comprises a first user data, a second user data and a video sensor data associated with a section of said annotated multimedia content; and
    a classification module that automatically classifies said annotated multimedia content by associating said annotated multimedia content with said recommended section.

13. The system of claim 12, wherein a list of prioritized predefined sections from said plurality of predefined sections is generated based said comparison, wherein the recommended section is a highest priority section from the list of prioritized predefined sections.

14. The system of claim 13, wherein said set of modules further comprises:
  a weight assigning module that establishes a quantitative weight factor associated with at least one of said video sensor data associated with said video, modifies said quantitative weight factor associated with said at least one of said video sensor data associated with said video to obtain a modified weight factor such that a user-suggested section becomes prioritized over said recommended section upon said comparison being performed based on said modified weight factor, and determines a modified recommended section for a subsequent video to be recorded at a subsequent time based on said modified weight factor; and
  a generation module that generates notes for at least one of said user-suggested section or said recommended section of said annotated multimedia content from at least one of said first user data, said second user data, and said video sensor data.

15. The system of claim 14, wherein said notes for said user-suggested section or said recommended section of said annotated multimedia content comprise at least one of identities of said first user and said second user, a line in said script at which said first user or said second user is talking, activities of said first user or said second user, character information, scene information, and event information.

16. The system of claim 15, further comprising at least one additional sensor that senses identities, or health-related information comprising heart rates, perspirations, respirations of said first user and said second user.

17. The system of claim 16, wherein said set of modules comprise a synchronization module that synchronizes said video, said first user data, said second user data, and said video sensor data to identify said corresponding first user data, said corresponding second user data, and said corresponding video sensor data for said any given duration.

18. The system of claim 17, further comprising a central network computing device that comprises data from prior scenes and shoots that are specific to said video production, a location data, and weather information from said shoots.

19. A system for automatically generating notes for a multimedia content that is specific to a video production based on a user context, said system comprising:
  a first audio capturing device adapted to be attached to a first user, wherein said first audio capturing device captures a first audio;
  a second audio capturing device adapted to be attached to a second user, wherein said second audio capturing device captures a second audio;
  a first audio sensor coupled to said first audio capturing device, wherein said first audio sensor captures a first user data comprising a time series of a location data, a direction data, and an orientation data associated with said first user;
  a second audio sensor coupled to said second audio capturing device, wherein said second audio sensor captures a second user data comprising a time series of a location data, a direction data, and an orientation data associated with said second user;

a video capturing device that captures a video associated with said first user and said second user;

a video sensor embedded in said video capturing device, wherein said video sensor captures a video sensor data comprising a time series of a location data, a direction data, an orientation data, and a position of said first user and said second user being recorded;

a memory unit that stores instructions;

a database operatively connected to said memory unit; and a processor, when configured by said instructions, executes a set of module comprising:

a first module that obtains said first user data, said second user data, and said video sensor data;

a second module that identifies for any given duration associated with said first audio, said second audio, or said video, corresponding first user data, corresponding second user data, and corresponding video sensor data;

a third module that annotates at least one of said first audio, said second audio and said video with said corresponding first user data, said corresponding second user data, and said corresponding video sensor data to obtain an annotated multimedia content;

a fourth module that identifies that performs a comparison of a data pattern of said annotated multimedia content with data patterns that correspond to a plurality of predefined sections of a script stored in said database to obtain a recommended section, wherein said plurality of predefined sections are specific to said video production, and wherein said data pattern comprises a first user data, a second user data and a video sensor data associated with a section of said annotated multimedia content;

a fifth module that automatically classifies said annotated multimedia content by associating said annotated multimedia content with said recommended section; and a sixth module that automatically generates notes for said recommended section of said annotated multimedia content from at least one of said first user data, said second user data, and said video sensor data that are associated with said section, and said predefined data based on said comparison.

20. The system of claim 19, wherein said script comprises at least one of identities, dialogues, activities, characters, locations, directions, orientations, positions, movements, scenes, and themes associated with said first user and said second user.

* * * * *